United States Patent
Zawada et al.

(10) Patent No.: US 9,898,178 B2
(45) Date of Patent: Feb. 20, 2018

(54) SYSTEMS AND METHODS FOR UTILIZING AVAILABLE MAP RESOURCES TO GENERATE PREVIEWS FOR MAP PORTIONS

(71) Applicant: Facebook, Inc., Menlo Park, CA (US)

(72) Inventors: Tomasz Zawada, San Francisco, CA (US); Kunal Bhalla, Menlo Park, CA (US); Jason Michael Carreiro, Mansfield, MA (US)

(73) Assignee: Facebook, Inc., Menlo Park, CA (US)

( * ) Notice: Subject to any disclaimer, the term of this patent is extended or adjusted under 35 U.S.C. 154(b) by 108 days.

(21) Appl. No.: 14/855,116

(22) Filed: Sep. 15, 2015

(65) Prior Publication Data

US 2017/0076424 A1    Mar. 16, 2017

(51) Int. Cl.
  *G06T 3/40*    (2006.01)
  *G06F 3/0484*    (2013.01)
  *G06Q 50/00*    (2012.01)

(52) U.S. Cl.
  CPC ......... *G06F 3/04845* (2013.01); *G06Q 50/01* (2013.01); *G06F 2203/04806* (2013.01)

(58) Field of Classification Search
  None
  See application file for complete search history.

(56) References Cited

U.S. PATENT DOCUMENTS

| | | | | |
|---|---|---|---|---|
| 5,848,373 A | * | 12/1998 | DeLorme | G01C 21/20 340/990 |
| 8,970,583 B1 | * | 3/2015 | Overbeck | G06T 17/05 345/419 |
| 2007/0176796 A1 | * | 8/2007 | Bliss | G01C 21/367 340/995.14 |

* cited by examiner

*Primary Examiner* — Edward Martello
(74) *Attorney, Agent, or Firm* — Sheppard Mullin Richter & Hampton LLP

(57) ABSTRACT

Systems, methods, and non-transitory computer-readable media can provide a particular map portion out of a plurality of map portions representing a particular region. An instruction to zoom in, to a requested zoom level, with respect to the particular map portion can be received. It can be determined that a set of four map portions for representing the particular map portion at the requested zoom level is yet to be available. The set of four map portions for representing the particular map portion at the requested zoom level can be acquired. An enlarged version of the particular map portion can be provided, based on the requested zoom level, as a preview for the set of four map portions. The enlarged version of the particular map portion can be provided while the set of four map portions is being acquired.

16 Claims, 9 Drawing Sheets

SYSTEMS AND METHODS FOR UTILIZING AVAILABLE MAP RESOURCES TO GENERATE PREVIEWS FOR MAP PORTIONS

FIELD OF THE INVENTION

The present technology relates to the field of electronic mapping. More particularly, the present technology relates to techniques for utilizing available map resources to generate previews for map portions.

BACKGROUND

Today, people often utilize computing devices (or systems) for a wide variety of purposes. Users can use their computing devices to, for example, interact with one another, access content, share content, and create content. In some cases, users can utilize their computing devices to download, view, access, or otherwise interact with maps, such as digital or electronic maps. For instance, users of a social networking system (or service) can, via their computing devices, access maps by browsing information about places or by checking in at various locations.

Under conventional approaches rooted in computer technology, a map can be created, rendered, or generated from a plurality of map portions, such as map tiles or map squares. However, when map portions for certain map areas are not yet downloaded, loaded, rendered, or available, conventional approaches typically provide indications that such map areas are unavailable. For example, conventional approaches can display gray tiles or grey squares to indicate or illustrate that such map areas are not yet available. However, such indications (e.g., gray tiles, grey squares) that map areas are unavailable can be distracting, inconvenient, uninteresting, or otherwise undesirable for a user attempting to use the map. As such, conventional approaches can create challenges for or reduce the overall experience associated with utilizing maps.

SUMMARY

Various embodiments of the present disclosure can include systems, methods, and non-transitory computer readable media configured to provide a particular map portion out of a plurality of map portions representing a particular region. An instruction to zoom in, to a requested zoom level, with respect to the particular map portion can be received. It can be determined that a set of four map portions for representing the particular map portion at the requested zoom level is yet to be available. The set of four map portions for representing the particular map portion at the requested zoom level can be acquired. An enlarged version of the particular map portion can be provided, based on the requested zoom level, as a preview for the set of four map portions. The enlarged version of the particular map portion can be provided while the set of four map portions is being acquired.

In an embodiment, a second instruction to zoom in, to a second requested zoom level, with respect to an area represented by a first map portion in the set of four map portions can be received. It can be determined that an additional set of four map portions for representing the first map portion at the second requested zoom level is yet to be available. The additional set of four map portions for representing the first map portion at the second requested zoom level can be acquired. An enlarged version of the first map portion can be provided, based on the second requested zoom level, as a preview for the additional set of four map portions. The enlarged version of the first map portion can be provided while the additional set of four map portions is being acquired.

In an embodiment, the particular map portion can be represented as a particular node in a quad tree data structure. Each map portion in the set of four map portions can be represented as a respective child node of the particular node in the quad tree data structure.

In an embodiment, determining that the set of four map portions for representing the particular map portion at the requested zoom level is yet to be available can further comprise determining that one or more child nodes of the particular node in the quad tree data structure have yet to store map data respectively for one or more map portions in the set of four map portions.

In an embodiment, acquiring the set of four map portions for representing the particular map portion at the requested zoom level can further comprise identifying the particular node in the quad tree data structure. The quad tree data structure can be searched for one or more child nodes of the particular node. A respective identifier can be acquired for each respective child node, of the particular node, that represents each map portion in the set of four map portions. Map data associated with each map portion in the set of four map portions can be acquired based on each respective identifier for each respective child node.

In an embodiment, at least some data associated with the quad tree data structure can be stored within a least recently used (LRU) cache.

In an embodiment, at least one ancestor node in the quad data tree structure can store a link to at least one available descendent node. The link can avoid linking from the at least one ancestor node to at least one unavailable intermediary node between the at least one ancestor node and the at least one descendent node.

In an embodiment, map data stored at the at least one ancestor node can be utilized to generate a preview for at least one representative map portion associated with the at least one descendent node.

In an embodiment, a command to zoom out, to a particular zoom level, with respect to the particular map portion and three map portions adjacent the particular map portion can be received. It can be determined that a given map portion for representing the particular map portion and the three map portions at the particular zoom level is yet to be available. The given map portion for representing the particular map portion and the three map portions at the particular zoom level can be acquired. A shrunken version of the particular map portion and the three map portions can be provided, based on the particular zoom level, as a preview for the given map portion. The shrunken version of the particular map portion and the three map portions can be provided while the given map portion is being acquired.

In an embodiment, the particular map portion and each map portion in the set of four map portions can correspond to map tiles.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods

Figure 1:
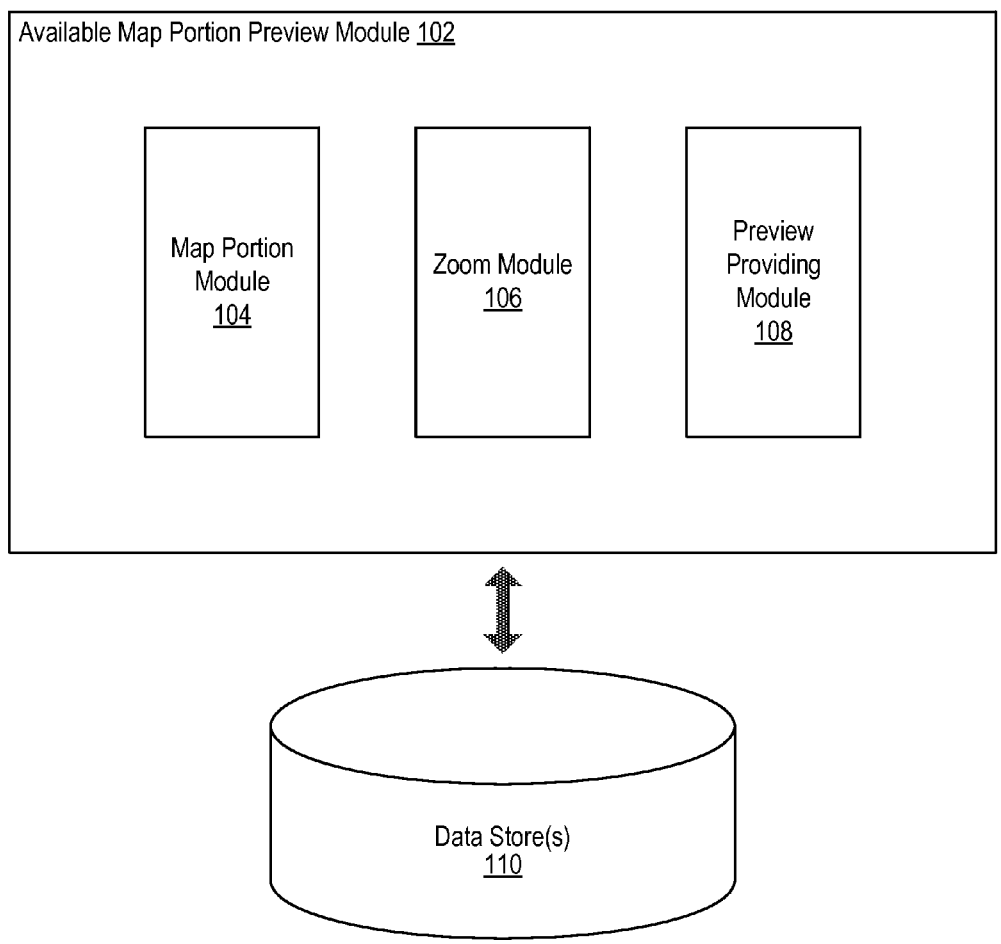
FIG. 1 illustrates an example system including an example available map portion preview module configured to facilitate utilizing available map resources to generate previews for map portions, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Utilizing Available Map Resources to Generate Previews for Map Portions

People use computing systems (or devices) for various purposes. Users can utilize their computing systems to establish connections, engage in communications, interact with one another, and/or interact with various types of content. In some cases, a user of a computing device can utilize maps, such as digital or electronic maps. For example, the user can utilize his or her computing device to navigate to a social networking system (or service) and to access maps provided via the social networking system, such as when browsing pages of places and/or when checking in at various locations. In another example, the user can access maps provided via a mapping web resource. In a further example, the user can access maps provided via a mapping application.

Conventional approaches rooted in computer technology can involve generating a map using multiple map portions (or map data associated with the multiple map portions) to collectively form the map. However, conventional approaches can, in many cases, depict unavailable map areas in a manner that is distracting, uninteresting, or otherwise undesirable, such as when the map portions corresponding to those map areas are not yet downloaded, loaded, rendered, or available. In one example, a user of a computing device can request a map for a particular location. In this example, when the user attempts to zoom in with respect to the particular location, conventional approaches to providing maps can display gray tiles or grey squares for the zoomed-in particular location while attempting to acquire, fetch, download, or load the appropriate map tiles for displaying the zoomed-in particular location. Accordingly, such conventional approaches can be inefficient, inconvenient, or undesirable.

Due to these or other concerns, conventional approaches can be disadvantageous or problematic. Therefore, an improved approach can be beneficial for addressing or alleviating various drawbacks associated with conventional approaches. Based on computer technology, the disclosed technology can utilize available map resources (e.g., available map tiles/squares) to generate previews for map portions. Various embodiments of the present disclosure can provide a particular map portion out of a plurality of map portions representing a particular region. An instruction to zoom in, to a requested zoom level, with respect to the particular map portion can be received. It can be determined that a set of four map portions for representing the particular map portion at the requested zoom level is yet to be available. The set of four map portions for representing the particular map portion at the requested zoom level can be acquired. An enlarged version of the particular map portion can be provided, based on the requested zoom level, as a preview for the set of four map portions. The enlarged version of the particular map portion can be provided while the set of four map portions is being acquired. It is contemplated that there can be many variations and/or other possibilities associated with the disclosed technology.

FIG. 1 illustrates an example system including an example available map portion preview module 102 configured to facilitate utilizing available map resources to generate previews for map portions, according to an embodiment of the present disclosure. As shown in the example of FIG. 1, the available map portion preview module 102 can include a map portion module 104, a zoom module 106, and a preview providing module 108. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

In some embodiments, the available map portion preview module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the available map portion preview module 102 can be implemented, in part or in whole, as software running on one or more computing devices or systems, such as on a user or client computing device. For example, the available map portion preview module 102 or at least a portion thereof can be implemented as or within an application (e.g., app), a program, an applet, or an operating system, etc., running on a user computing device or a client computing system, such as the user device 710 of FIG. 7. In another example, the available map portion preview module 102 or at least a portion thereof can be implemented using one or more computing devices or systems that include one or more servers, such as network servers or cloud servers. In some instances, the available map portion preview module 102 can, in part or in whole, be implemented within or configured to operate in conjunction with a social networking system (or service), such as the social networking system 730 of FIG. 7. It should be appreciated that there can be many variations or other possibilities.

The map portion module 104 can be configured to facilitate providing a particular map portion out of a plurality of map portions (e.g., map tiles, map squares, map rectangles, map polygons, etc.) representing a particular region. In some embodiments, the map portion module 104 can provide the particular map portion in conjunction with the other map portions in the plurality of map portions that represent the particular region. In one example, when a user searches for a particular location, address, or landmark, etc., within an electronic map (e.g., a dynamic map, an interactive map, etc.), the map portion module 104 can provide multiple map portions, including a particular map portion, that depict, illustrate, or represent a map area corresponding to the particular location, address, or landmark, etc. In another example, when the user provides a command or an instruction to move a map (i.e., an electronic or digital map) to a particular area, the map portion module 104 can provide a group of map portions depicting, illustrating, or representing the particular area, and the particular map portion can be included in the group of map portions. It should be understood that all examples herein are provided for illustrative purposes and that there can be many variations or other possibilities associated with the disclosed technology. More details regarding the map portion module 104 will be provided below.

The zoom module 106 can be configured to facilitate receiving an instruction to zoom in, to a requested zoom level, with respect to the particular map portion. In some embodiments, the zoom module 106 can receive, fetch, detect, or otherwise acquire the instruction from a user who has provided the instruction (or command). In one instance, the user can perform a touch gesture (e.g., double tap, two-finger spread, etc.), a mouse operation (e.g., double click, clicking on a zoom-in button, etc.), and/or a keyboard operation (e.g., various key presses) to provide the instruction to zoom in with respect to the particular map portion. In another instance, the instruction to zoom can be automatically provided, such as via a system setting, a default parameter, or other specified logic. It should be appreciated that many variations are possible.

Moreover, the map portion module 104 can also be configured to facilitate determining that a set of a plurality of map portions, such as four map portions, for representing the particular map portion at the requested zoom level is yet to be available or ready for presentation. Although a set of map portions for representing a particular map portion at the requested zoom level are described in various examples herein as having four map portions for ease of illustration, the set of map portions can include any suitable number of map portions. In some embodiments, when the particular map portion is zoomed-in to the requested zoom level, there can be a set of four map portions that represents the particular map portion at the requested zoom level. In some cases, when the particular map portion is initially zoomed-in to the requested zoom level, the set of four map portions has yet to be downloaded, stored, loaded, and/or rendered, etc., and thus is yet to be available for presentation to a user. The map portion module 104 can detect or determine that the set of four map portions is not yet available.

Additionally, the map portion module 104 can further be configured to facilitate acquiring (or initiating an acquisition of) the set of four map portions for representing the particular map portion at the requested zoom level. In some implementations, when the set of four map portions for representing the particular map portion at the requested zoom level is yet to be available, the map portion module 104 can initiate or resume downloading, storing, loading, rendering, and/or otherwise acquiring the set of four map portions that represents the particular map portion at the requested zoom level. The map portion module 104 will be discussed in more detail below with reference to FIG. 2.

In some implementations, the preview providing module 108 can be configured to facilitate providing an enlarged (or zoomed-in) version of the particular map portion, based on the requested zoom level, as a preview for the set of four map portions. The enlarged version of the particular map portion can be provided by the preview providing module 108 while the set of four map portions is being acquired by the map portion module 104. Accordingly, the disclosed technology can display the enlarged version of the particular map portion rather than displaying one or more gray tiles or grey squares that indicate that the map portions for the particular map portion at the requested zoom level are not yet available. When acquiring the set of four map portions is completed, the set of four map portions can be provided instead of the enlarged version of the particular map portion.

Furthermore, in some embodiments, the available map portion preview module 102 can be configured to communicate and/or operate with the at least one data store 110, as shown in the example system 100. The at least one data store 110 can be configured to store and maintain various types of data. In some implementations, the at least one data store 110 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 110 can store information associated with users, such as user identifiers, user information, profile information, user locations, user specified settings, content produced or posted by users, and various other types of user data. In some embodiments, the at least one data store 110 can store information that is utilized by the available map portion preview module 102, such as available map portions for a particular map portion at a requested zoom level.

Again, it is contemplated that there can be many variations or other possibilities associated with the disclosed technology. For instance, in some embodiments, the zoom module 106 can receive a second instruction to zoom in, to a second requested zoom level, with respect to an area represented by a first map portion in the set of four (or other suitable number of) map portions. The map portion module 104 can determine that an additional set of four (or other suitable number of) map portions for representing the first map portion at the second requested zoom level is yet to be available or ready for presentation. The map portion module 104 can also acquire (or initiate an acquisition of) the additional set of four map portions for representing the first map portion at the second requested zoom level. The preview providing module 108 can provide an enlarged version of the first map portion, based on the second requested zoom level, as a preview for the additional set of four map portions. The enlarged version of the first map portion can be provided while the additional set of four map portions is being acquired. When acquiring the additional set of four map portions is completed, the additional set of four map portions can be provided, by the map portion module 104, instead of the enlarged version of the first map portion. This process can be repeated for a third instruction at a third requested zoom level, a fourth instruction at a fourth requested zoom level, and so forth.

Additionally, in some implementations, the zoom module 106 can also receive a command to zoom out, to a particular zoom level, with respect to the particular map portion and three map portions adjacent the particular map portion in an example where four map portions are presented to a user. For example, the user can perform another touch gesture (e.g., double tap, two-finger pinch, etc.), a mouse operation (e.g., double click, clicking on a zoom-out button, etc.), and/or a keyboard operation (e.g., various key presses) to provide the command to zoom out with respect to the particular map portion and the three map portions.

In an instance where four map portions are presented, the particular map portion can correspond to an upper left map tile and the three map portions can correspond to the lower left map tile, the upper right map tile, and the lower right map tile. In another instance, the particular map portion can be a lower left map tile while the adjacent three map portions can be the upper left, upper right, and lower right map tiles. In a further instance, the particular map portion can be an upper right map tile while the adjacent three map portions can be the upper left, lower left, and lower right map tiles. In another instance, the particular map portion can be a lower right map tile while the adjacent three map portions can be the upper left, upper right, and lower left map tiles. Many variations involving, for example, other suitable numbers of map portions are possible.

In some embodiments, the map portion module 104 can determine that a given map portion for representing the particular map portion and the three map portions at the particular zoom level is yet to be available. The given map portion can, for example, have an outer boundary corresponding to that of a map area formed collectively by the particular map portion and the three adjacent map portions. Moreover, the map portion module 104 can acquire (or initiate an acquisition of) the given map portion for representing the particular map portion and the three map portions at the particular zoom level. The preview providing module 108 can provide a shrunken (or zoomed-out) version of the particular map portion and the three map portions, based on the particular zoom level, as a preview for the given map portion. The shrunken version of the particular map portion and the three map portions can be provided while the given map portion is being acquired. This can be an improvement over displaying gray tiles or grey squares that indicate that the given map portion at the particular zoom level is not yet available (or ready). When acquiring the given map portion is completed, the given map portion can be presented, by the map portion module 104, instead of the shrunken version of the particular map portion and the three map portions. As discussed previously, it should be appreciated that many variations are possible.

Figure 2:
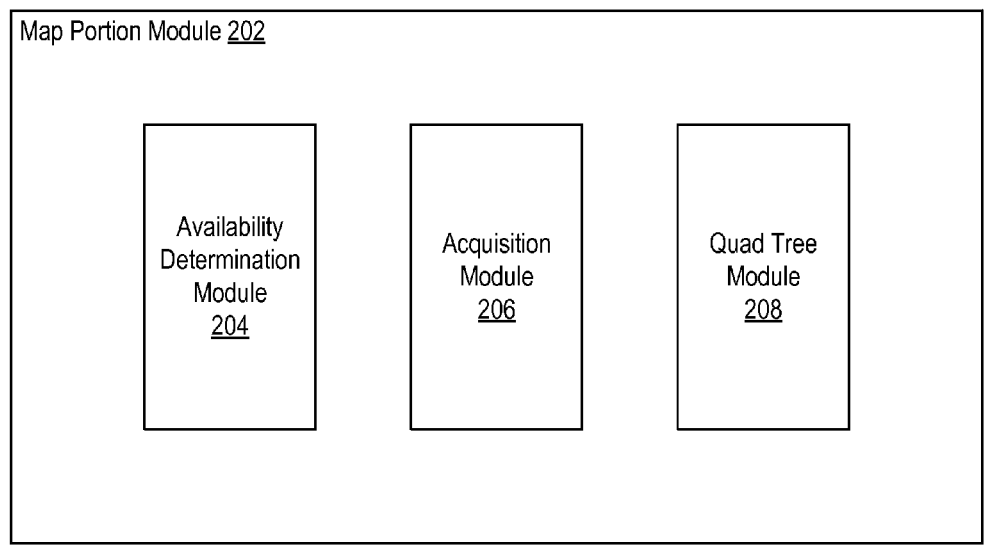
FIG. 2 illustrates an example map portion module configured to facilitate utilizing available map resources to generate previews for map portions, according to an embodiment of the present disclosure.

FIG. 2 illustrates an example map portion module 202 configured to facilitate utilizing available map resources to generate previews for map portions, according to an embodiment of the present disclosure. In some embodiments, the map portion identification module 106 of FIG. 1 can be implemented as the example map portion module 202. As shown in FIG. 2, the map portion module 202 can include an availability determination module 204, an acquisition module 206, and a quad tree module 208.

The map portion module 202 can be configured to facilitate performing various tasks or operations associated with handling or processing one or more map portions of a map. In some embodiments, the map portion module 202 can utilize the availability determination module 204 to determine whether or not one or more map portions at one or more specified zoom levels are downloaded, stored, loaded, rendered, and/or otherwise available. Moreover, in some implementations, the map portion module 202 can utilize the acquisition module 206 to acquire, download, store, load, render, and/or otherwise make available the one or more map portions at the one or more specified zoom levels when the one or more map portions are yet to be available. Many variations are possible.

In one example, the availability determination module 204 can determine that a set of four (or other suitable number of) map portions for representing a particular map portion at a requested zoom level, such as when zooming in, is yet to be available, as discussed previously. The acquisition module 206 can then acquire the set of four map portions for representing the particular map portion at the requested zoom level. In another example, the availability determination module 204 can determine that an additional set of four map portions for representing a first map portion, in the (initial) set of four map portions and at a second requested zoom level, is yet to be available. Then the acquisition module 206 can acquire the additional set of four map portions for representing the first map portion at the second requested zoom level, as discussed above. In a further example, the availability determination module 204 can determine that a given map portion for representing the particular map portion and three adjacent map portions at a particular zoom level, such as when zooming out, is yet to be available. The acquisition module 206 can then acquire the given map portion for representing the particular map portion and the three map portions at the particular zoom level, as discussed. There can be many variations or other possibilities.

Moreover, in some cases, the map portion module 202 can utilize the quad tree module 208 to cause the particular map portion to be represented as a particular node in a quad tree data structure. The quad tree module 208 can also cause each map portion in the set of four map portions to be represented as a respective child node of the particular node in the quad tree data structure. There can be many variations or other possibilities.

Additionally, in some embodiments, the availability determination module 204, the acquisition module 206, and the quad tree module 208 can work or operate in conjunction with one another to perform various operations and/or to process various tasks. In some cases, the availability determination module 204 can determine that the set of four map portions for representing the particular map portion at the requested zoom level is yet to be available by interacting with the quad tree module 208 to determine that one or more child nodes of the particular node in the quad tree data structure have yet to store map data respectively for one or more map portions in the set of four map portions. In some instances, the acquisition module 206 can acquire the set of four map portions for representing the particular map portion at the requested zoom level by operating in conjunction with the quad tree module 208 to identify the particular node in the quad tree data structure, to search for one or more child nodes of the particular node in the quad tree data structure, to acquire a respective identifier for each respective child node of the particular node that represents each map portion in the set of four map portions, and to acquire map data associated with each map portion in the set of four map portions based on each respective identifier for each respective child node. As discussed, many variations are possible.

Furthermore, in some implementations, at least some data associated with the quad tree data structure can be stored within a least recently used (LRU) cache. For instance, as new data is stored into the LRU cache, older data that has not been accessed or utilized for some duration of time can be removed from the LRU cache. Moreover, in some embodiments, at least one ancestor node in the quad data tree structure can store a link (e.g., a pointer) to at least one available descendent node. The link can avoid linking from the at least one ancestor node to at least one unavailable intermediary node between the at least one ancestor node and the at least one descendent node. In some cases, a descendent node can also store a link to an available ancestor node. This approach can improve efficiency by skipping over non-existent or unavailable intermediary nodes. Additionally, in some implementations, map data stored at the at least one ancestor node can be utilized to generate a preview for at least one representative map portion associated with the at least one descendent node (and vice versa). For instance, if an ancestor node is a grandparent of a descendent node and if a parent node of the descendent node is unavailable, then map data stored at the ancestor node can be used to generate an enlarged map portion to provide a (temporary) preview while map data for the descendent node (and for its sibling nodes) is being acquired. Again, it should be appreciated that many variations are possible.

Figure 3:
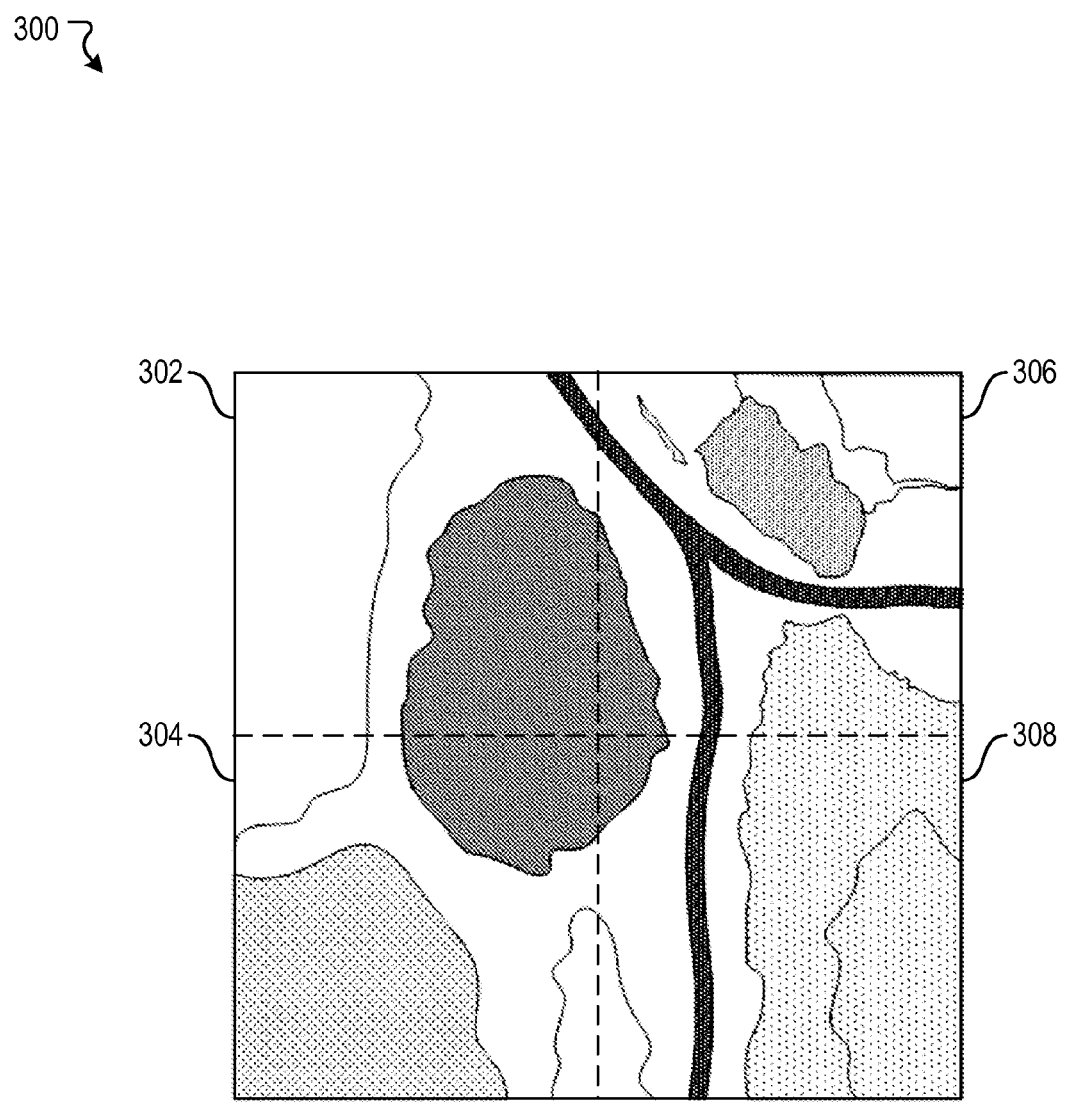
FIG. 3 illustrates an example scenario associated with utilizing available map resources to generate previews for map portions, according to an embodiment of the present disclosure.

FIG. 3 illustrates an example scenario 300 associated with utilizing available map resources to generate previews for map portions, according to an embodiment of the present disclosure. In the example scenario 300 of FIG. 3, there can be a plurality of map portions representing a particular region. In this example, the plurality of map portions representing the particular region can include four map portions 302, 304, 306, and 308. It should be understood that the dotted lines indicate that the four map portions are distinct map portions (e.g., map tiles, map squares, etc.).

In one instance, an instruction to zoom in, to a requested zoom level, with respect to a particular map portion 306 out of the plurality of map portions (e.g., map portions 302, 304, 306, and 308) can be received or acquired. The disclosed technology determines, however, that a set of four map portions for representing the particular map portion 306 at the requested zoom level is yet to be available. Accordingly, the disclosed technology can acquire (or begin acquiring) the set of four map portions for representing the particular map portion at the requested zoom level.

Figure 4:
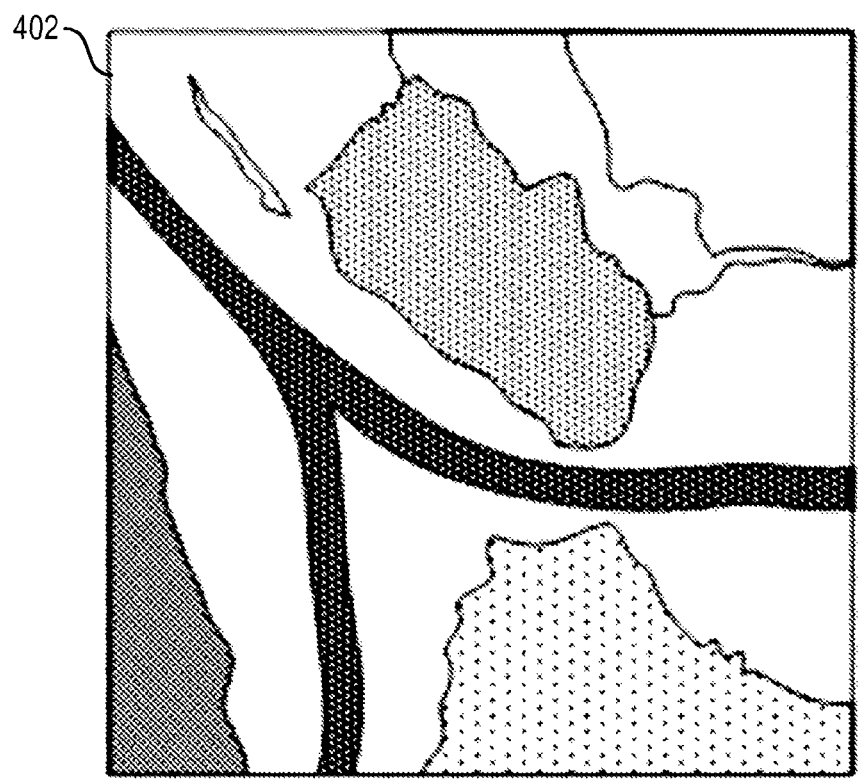
FIG. 4 illustrates an example scenario associated with utilizing available map resources to generate previews for map portions, according to an embodiment of the present disclosure.

FIG. 4 illustrates an example scenario 400 associated with utilizing available map resources to generate previews for map portions, according to an embodiment of the present disclosure. The example scenario 400 of FIG. 4 can illustrate the example scenario 300 of FIG. 3 subsequent to receiving the instruction to zoom in the particular map portion 306 to the requested zoom level.

In the example scenario 400 of FIG. 4, the disclosed technology has provided, rendered, presented, and/or displayed an enlarged version 402 of the particular map portion 306, based on the requested zoom level, as a preview for the set of four map portions. The enlarged (e.g., zoomed-in, stretched, etc.) version 402 of the particular map portion 306 is provided while the set of four map portions is being acquired. In some cases, the enlarged version 402 can be blurry or pixelated due to the enlarging, zooming, and/or stretching. The enlarged version 402 can nonetheless provide an improvement over displaying gray tiles or other graphics indicating that one or more appropriate map portions are unavailable.

Figure 5:
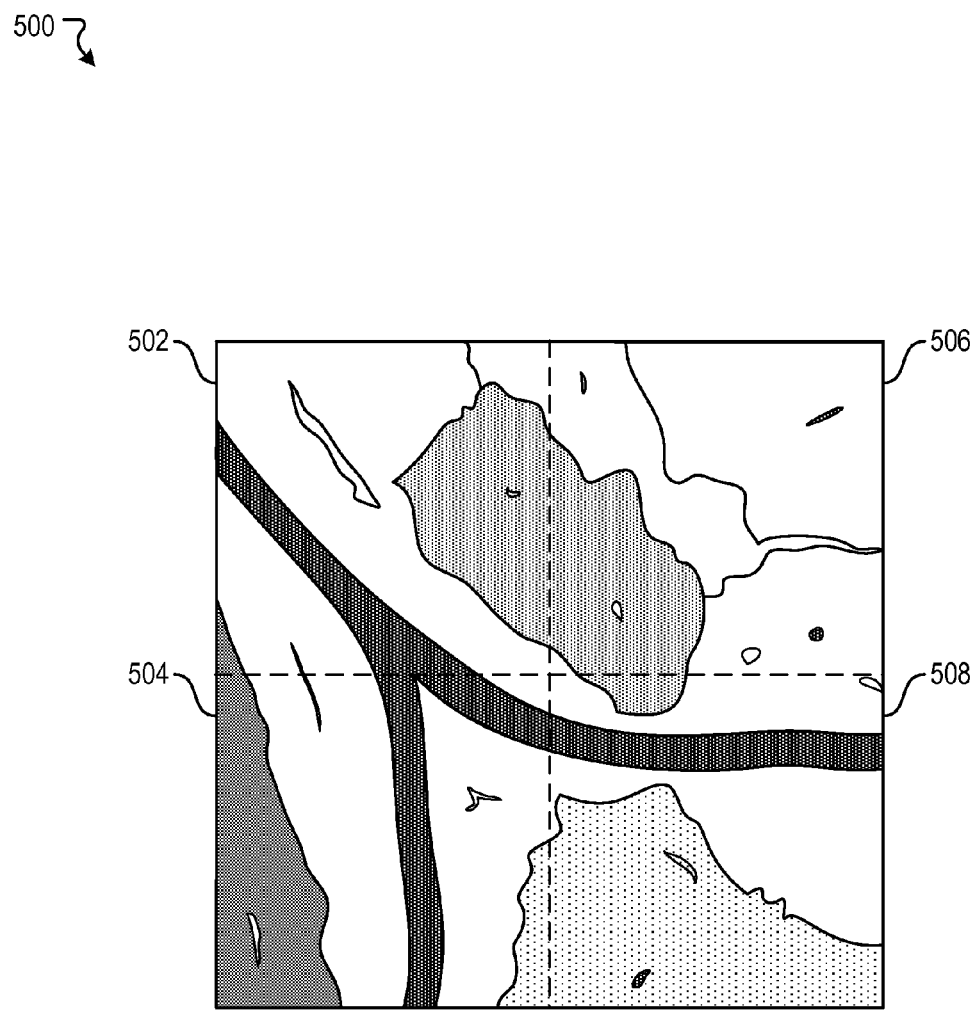
FIG. 5 illustrates an example scenario associated with utilizing available map resources to generate previews for map portions, according to an embodiment of the present disclosure.

FIG. 5 illustrates an example scenario 500 associated with utilizing available map resources to generate previews for map portions, according to an embodiment of the present disclosure. The example scenario 500 of FIG. 5, can illustrate the example scenario 400 of FIG. 4 subsequent to the set of four map portions (e.g., map portions 502, 504, 506, and 508) being acquired. As shown in the example scenario 500, the set of four map portions 502, 504, 506, and 508 can provide a more detailed, more accurate, more complete, or otherwise more informative presentation of a requested region at the requested zoom level. Again, all examples herein are provided for illustrative purposes and many variations associated with the disclosed technology are possible.

Figure 6A:
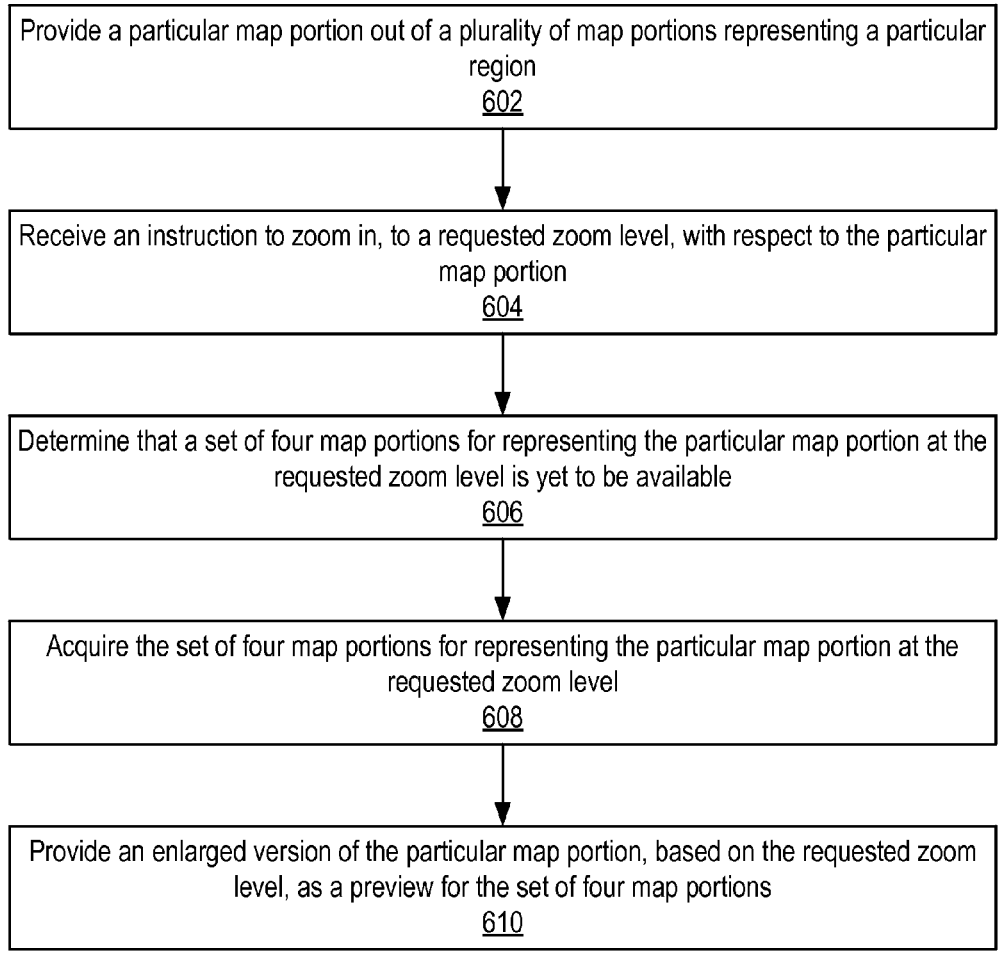
FIG. 6A illustrates an example method associated with utilizing available map resources to generate previews for map portions, according to an embodiment of the present disclosure.

FIG. 6A illustrates an example method 600 associated with utilizing available map resources to generate previews for map portions, according to an embodiment of the present disclosure. It should be appreciated that there can be additional, fewer, or alternative steps performed in similar or alternative orders, or in parallel, within the scope of the various embodiments unless otherwise stated.

At block 602, the example method 600 can provide a particular map portion out of a plurality of map portions representing a particular region. At block 604, the example method 600 can receive an instruction to zoom in, to a requested zoom level, with respect to the particular map portion. At block 606, the example method 600 can determine that a set of four map portions for representing the particular map portion at the requested zoom level is yet to be available. At block 608, the example method 600 can acquire (or initiate an acquisition of) the set of four map portions for representing the particular map portion at the requested zoom level. At block 610, the example method 600 can provide an enlarged version of the particular map portion, based on the requested zoom level, as a preview for the set of four map portions. The enlarged version of the particular map portion can be provided while the set of four map portions is being acquired.

Figure 6B:
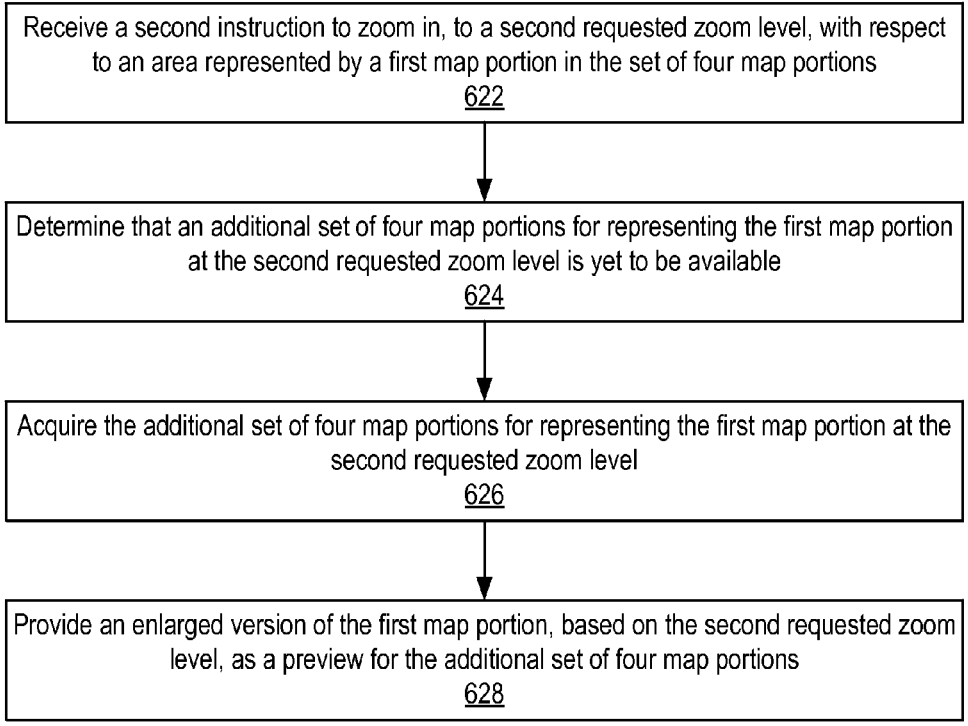
FIG. 6B illustrates an example method associated with utilizing available map resources to generate previews for map portions, according to an embodiment of the present disclosure.

FIG. 6B illustrates an example method 620 associated with utilizing available map resources to generate previews for map portions, according to an embodiment of the present disclosure. As discussed, it should be understood that there can be additional, fewer, or alternative steps performed in similar or alternative orders, or in parallel, within the scope of the various embodiments unless otherwise stated.

At block 622, the example method 620 can receive a second instruction to zoom in, to a second requested zoom level, with respect to an area represented by a first map portion in the set of four map portions. At block 624, the example method 620 can determine that an additional set of four map portions for representing the first map portion at the second requested zoom level is yet to be available. At block 626, the example method 620 can acquire (or initiate an acquisition of) the additional set of four map portions for representing the first map portion at the second requested zoom level. At block 628, the example method 620 can provide an enlarged version of the first map portion, based on the second requested zoom level, as a preview for the additional set of four map portions. The enlarged version of the first map portion can be provided while the additional set of four map portions is being acquired.

It is contemplated that there can be many other uses, applications, features, possibilities, and/or variations associated with the various embodiments of the present disclosure. For example, in some cases, users can choose whether or not to opt-in to utilize the disclosed technology. The disclosed technology can, for instance, also ensure that various privacy settings and preferences are maintained and can prevent private information from being divulged. In another example, various embodiments of the present disclosure can learn, improve, and/or be refined over time.

Social Networking System—Example Implementation

Figure 7:
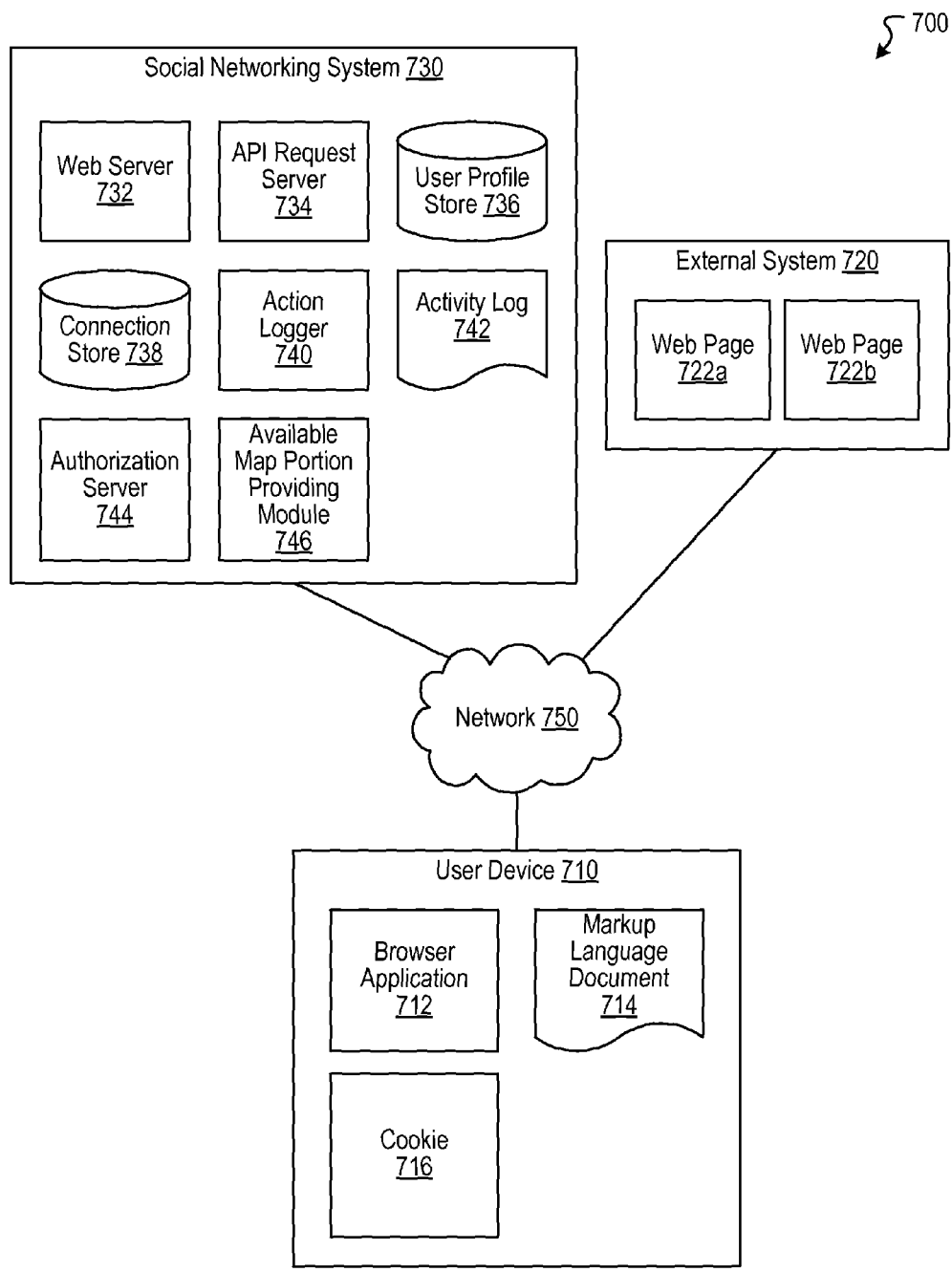
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet. In some embodiments, the social networking system 730 can include or correspond to a social media system (or service).

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the Silverlight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722*a*, 722*b*, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722*a* within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include an available map portion preview module 746. The available map portion preview module 746 can, for example, be implemented as the available map portion preview module 102 of FIG. 1. As discussed previously, it should be appreciated that there can be many variations or other possibilities. For example, in some instances, the available map portion preview module (or at least a portion thereof) can be included or implemented in the user device 710. Other features of the available map portion preview module 746 are discussed herein in connection with the available map portion preview module 102.

Hardware Implementation

Figure 8:
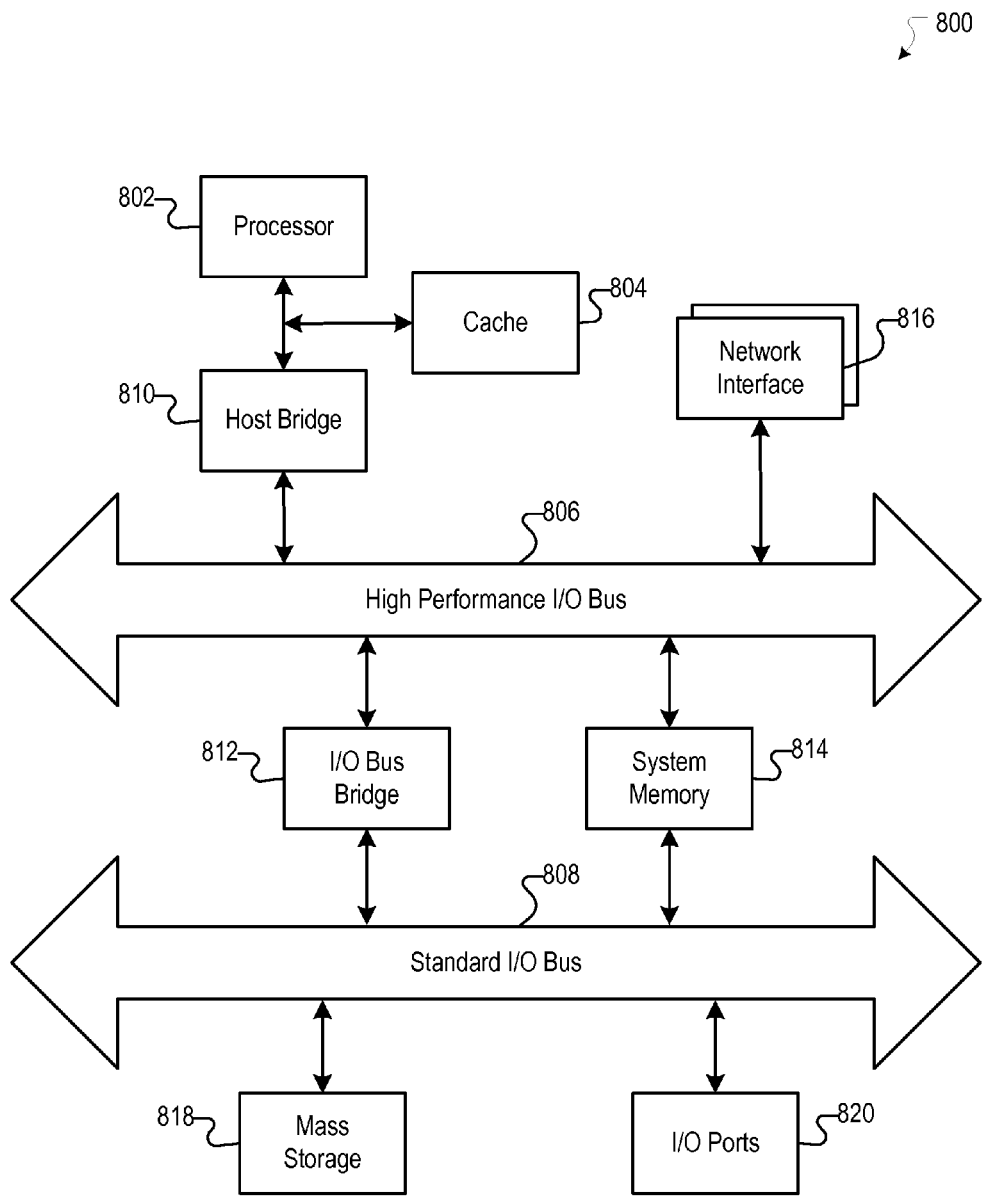
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments. Furthermore, reference in this specification to "based on" can mean "based, at least in part, on", "based on at least a portion/part of", "at least a portion/part of which is based on", and/or any combination thereof.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   providing, by a computing system, a particular map portion out of a plurality of map portions representing a particular region;
   receiving, by the computing system, an instruction to zoom in, to a requested zoom level, with respect to the particular map portion;
   determining, by the computing system, that a set of four map portions for representing the particular map portion at the requested zoom level is yet to be available;
   acquiring, by the computing system, the set of four map portions for representing the particular map portion at the requested zoom level; and
   providing, by the computing system, an enlarged version of the particular map portion, based on the requested zoom level, as a preview for the set of four map portions, wherein the enlarged version of the particular map portion is provided while the set of four map portions is being acquired, wherein
   the plurality of map portions are represented as a plurality of nodes in a quad tree data structure,
   at least one ancestor node in the quad tree data structure stores a pointer to at least one available descendent node, and
   the pointer avoids linking from the at least one ancestor node to at least one unavailable intermediary node between the at least one ancestor node and the at least one descendent node.

2. The computer-implemented method of claim 1, further comprising:
   receiving a second instruction to zoom in, to a second requested zoom level, with respect to an area represented by a first map portion in the set of four map portions;
   determining that an additional set of four map portions for representing the first map portion at the second requested zoom level is yet to be available;
   acquiring the additional set of four map portions for representing the first map portion at the second requested zoom level; and
   providing an enlarged version of the first map portion, based on the second requested zoom level, as a preview for the additional set of four map portions, wherein the enlarged version of the first map portion is provided while the additional set of four map portions is being acquired.

3. The computer-implemented method of claim 1, wherein determining that the set of four map portions for representing the particular map portion at the requested zoom level is yet to be available further comprises determining that one or more child nodes of the particular node in the quad tree data structure have yet to store map data respectively for one or more map portions in the set of four map portions.

4. The computer-implemented method of claim 1, wherein acquiring the set of four map portions for representing the particular map portion at the requested zoom level further comprises:
   identifying the particular node in the quad tree data structure;
   searching for one or more child nodes of the particular node in the quad tree data structure;
   acquiring a respective identifier for each respective child node, of the particular node, that represents each map portion in the set of four map portions; and
   acquiring map data associated with each map portion in the set of four map portions based on each respective identifier for each respective child node.

5. The computer-implemented method of claim 1, wherein at least some data associated with the quad tree data structure is stored within a least recently used (LRU) cache.

6. The computer-implemented method of claim 1, wherein map data stored at the at least one ancestor node is utilized to generate a preview for at least one representative map portion associated with the at least one descendent node.

7. The computer-implemented method of claim 1, further comprising:
   receiving a command to zoom out, to a particular zoom level, with respect to the particular map portion and three map portions adjacent the particular map portion;
   determining that a given map portion for representing the particular map portion and the three map portions at the particular zoom level is yet to be available;
   acquiring the given map portion for representing the particular map portion and the three map portions at the particular zoom level; and
   providing a shrunken version of the particular map portion and the three map portions, based on the particular zoom level, as a preview for the given map portion, wherein the shrunken version of the particular map portion and the three map portions is provided while the given map portion is being acquired.

8. The computer-implemented method of claim 1, wherein the particular map portion and each map portion in the set of four map portions correspond to map tiles.

9. A system comprising:
   at least one processor; and
   a memory storing instructions that, when executed by the at least one processor, cause the system to perform:
      providing a particular map portion out of a plurality of map portions representing a particular region;

receiving an instruction to zoom in, to a requested zoom level, with respect to the particular map portion;

determining that a set of four map portions for representing the particular map portion at the requested zoom level is yet to be available;

acquiring the set of four map portions for representing the particular map portion at the requested zoom level; and providing an enlarged version of the particular map portion, based on the requested zoom level, as a preview for the set of four map portions, wherein the enlarged version of the particular map portion is provided while the set of four map portions is being acquired, wherein the plurality of map portions are represented as a plurality of nodes in a quad tree data structure, at least one ancestor node in the quad tree data structure stores a pointer to at least one available descendent node, and the pointer avoids linking from the at least one ancestor node to at least one unavailable intermediary node between the at least one ancestor node and the at least one descendent node.

10. The system of claim 9, wherein the instructions cause the system to further perform:

receiving a second instruction to zoom in, to a second requested zoom level, with respect to an area represented by a first map portion in the set of four map portions;

determining that an additional set of four map portions for representing the first map portion at the second requested zoom level is yet to be available;

acquiring the additional set of four map portions for representing the first map portion at the second requested zoom level; and providing an enlarged version of the first map portion, based on the second requested zoom level, as a preview for the additional set of four map portions, wherein the enlarged version of the first map portion is provided while the additional set of four map portions is being acquired.

11. The system of claim 9, wherein determining that the set of four map portions for representing the particular map portion at the requested zoom level is yet to be available further comprises determining that one or more child nodes of the particular node in the quad tree data structure have yet to store map data respectively for one or more map portions in the set of four map portions.

12. The system of claim 9, wherein acquiring the set of four map portions for representing the particular map portion at the requested zoom level further comprises:

identifying the particular node in the quad tree data structure;

searching for one or more child nodes of the particular node in the quad tree data structure;

acquiring a respective identifier for each respective child node, of the particular node, that represents each map portion in the set of four map portions; and acquiring map data associated with each map portion in the set of four map portions based on each respective identifier for each respective child node.

13. A non-transitory computer-readable storage medium including instructions that, when executed by at least one processor of a computing system, cause the computing system to perform a method comprising:

providing a particular map portion out of a plurality of map portions representing a particular region;

receiving an instruction to zoom in, to a requested zoom level, with respect to the particular map portion;

determining that a set of four map portions for representing the particular map portion at the requested zoom level is yet to be available;

acquiring the set of four map portions for representing the particular map portion at the requested zoom level; and providing an enlarged version of the particular map portion, based on the requested zoom level, as a preview for the set of four map portions, wherein the enlarged version of the particular map portion is provided while the set of four map portions is being acquired, wherein the plurality of map portions are represented as a plurality of nodes in a quad tree data structure, at least one ancestor node in the quad tree data structure stores a pointer to at least one available descendent node, and the pointer avoids linking from the at least one ancestor node to at least one unavailable intermediary node between the at least one ancestor node and the at least one descendent node.

14. The non-transitory computer-readable storage medium of claim 13, wherein the instructions cause the computing system to further perform:

receiving a second instruction to zoom in, to a second requested zoom level, with respect to an area represented by a first map portion in the set of four map portions;

determining that an additional set of four map portions for representing the first map portion at the second requested zoom level is yet to be available;

acquiring the additional set of four map portions for representing the first map portion at the second requested zoom level; and providing an enlarged version of the first map portion, based on the second requested zoom level, as a preview for the additional set of four map portions, wherein the enlarged version of the first map portion is provided while the additional set of four map portions is being acquired.

15. The non-transitory computer-readable storage medium of claim 13, wherein determining that the set of four map portions for representing the particular map portion at the requested zoom level is yet to be available further comprises determining that one or more child nodes of the particular node in the quad tree data structure have yet to store map data respectively for one or more map portions in the set of four map portions.

16. The non-transitory computer-readable storage medium of claim 13, wherein acquiring the set of four map portions for representing the particular map portion at the requested zoom level further comprises:

identifying the particular node in the quad tree data structure;

searching for one or more child nodes of the particular node in the quad tree data structure;

acquiring a respective identifier for each respective child node, of the particular node, that represents each map portion in the set of four map portions; and acquiring map data associated with each map portion in the set of four map portions based on each respective identifier for each respective child node.

* * * * *